United States Patent
Wasiq et al.

(10) Patent No.: US 10,649,903 B2
(45) Date of Patent: *May 12, 2020

(54) MODIFYING PROVISIONED THROUGHPUT CAPACITY FOR DATA STORES ACCORDING TO CACHE PERFORMANCE

(71) Applicant: Amazon Technologies, Inc., Seattle, WA (US)

(72) Inventors: Muhammad Wasiq, Vancouver (CA); Nima Sharifi Mehr, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/035,461

(22) Filed: Jul. 13, 2018

(65) Prior Publication Data

US 2018/0322066 A1    Nov. 8, 2018

Related U.S. Application Data

(63) Continuation of application No. 15/195,884, filed on Jun. 28, 2016, now Pat. No. 10,025,718.

(51) Int. Cl.
| | | |
|---|---|---|
| *G06F 12/08* | (2016.01) | |
| *G06F 12/0866* | (2016.01) | |
| *G06F 11/30* | (2006.01) | |
| *G06F 11/34* | (2006.01) | |

(52) U.S. Cl.
CPC ...... *G06F 12/0866* (2013.01); *G06F 11/3037* (2013.01); *G06F 11/34* (2013.01); *G06F 11/3409* (2013.01); *G06F 11/3466* (2013.01); *G06F 11/3442* (2013.01); *G06F 2201/885* (2013.01); *G06F 2212/1021* (2013.01); *G06F 2212/154* (2013.01); *G06F 2212/263* (2013.01); *G06F 2212/502* (2013.01)

(58) Field of Classification Search
CPC ......... G06F 2212/1021; G06F 12/0877; G06F 2212/154; G06F 2212/263; G06F 2212/60
USPC ...................................................... 711/118
See application file for complete search history.

(56) References Cited

U.S. PATENT DOCUMENTS

| | | |
|---|---|---|
| 7,216,196 B2 | 5/2007 | Jeddeloh |
| 7,555,499 B2 | 6/2009 | Shah et al. |
| 2006/0074970 A1 | 4/2006 | Narayanan et al. |
| 2011/0161973 A1 | 6/2011 | Klots et al. |
| 2015/0113223 A1 | 4/2015 | Brown et al. |

*Primary Examiner* — Hua J Song
(74) *Attorney, Agent, or Firm* — Robert C. Kowert; Kowert, Hood, Munyon, Rankin & Goetzel, P.C.

(57) ABSTRACT

Modifications to throughput capacity provisioned at a data store for servicing access requests to the data store may be performed according to cache performance metrics. A cache that services access requests to the data store may be monitored to collected and evaluate cache performance metrics. The cache performance metrics may be evaluated with respect to criteria for triggering different throughput modifications. In response to triggering a throughput modification, the throughput capacity for the data store may be modified according to the triggered throughput modification. In some embodiments, the criteria for detecting throughput modifications may be determined and modified based on cache performance metrics.

20 Claims, 9 Drawing Sheets

MODIFYING PROVISIONED THROUGHPUT CAPACITY FOR DATA STORES ACCORDING TO CACHE PERFORMANCE

This Application is a Continuation of U.S. patent application Ser. No. 15/195,884, Filed Jun. 28, 2016, now U.S. Pat. No. 10,025,718, which is hereby incorporated by reference herein in its entirety.

BACKGROUND

Persistent data storage is in high demand. Different organizations, companies, and individuals collect, transmit, and manage all kinds of data that needs to be stored. In order to more efficiently access stored data, some data storage systems may implement a cache in order to more efficiently process access requests. A cache may maintain a copy of different portions of the data stored in a data storage system in persistent storage devices, such as disk storage. When writes to the data stored in the distributed storage system are to be performed, a copy of the data modified by the write may be stored in the cache as well as the disk storage. Caches are typically implemented in system memory that provides quick access times for reading and writing data. Future read requests for the data may be serviced using data stored in the cache, without waiting for the read request to be serviced by the significantly slower persistent storage. Thus, storing more data in the cache may reduce the need to perform more costly storage operations to read data from persistent storage.

In addition to implementing a cache, processing resources for access requests at some data storage systems may be configured, allocated, or otherwise provisioned to ensure a guaranteed level of performance when accessing data at the data storage systems. For example, desired performance of processing operations for accessing a data object (e.g., a database table, folder, file, etc.) may be expressed as a throughput (e.g., a number of Input/Output operations per second (IOPs)). The appropriate resources may be assigned, allocated or reserved for processing access requests to the data object so that the desired performance is achieved. Performance needs, however, change over time. If the allocation of resources remains unchanged then scenarios where processing resources are wasted (e.g., being held in reservation for a data object) or overburdened (e.g., processing resources are unable to keep up with demand to access the data object) can occur. Therefore, timely changes to the allocation of resources for processing access requests can result in more efficient processing of access requests. Because caches relieve some of the processing load of the data storage system, modifications to the allocation of resources may be made based on insights gleaned from the utilization of a cache.

Figure 1:
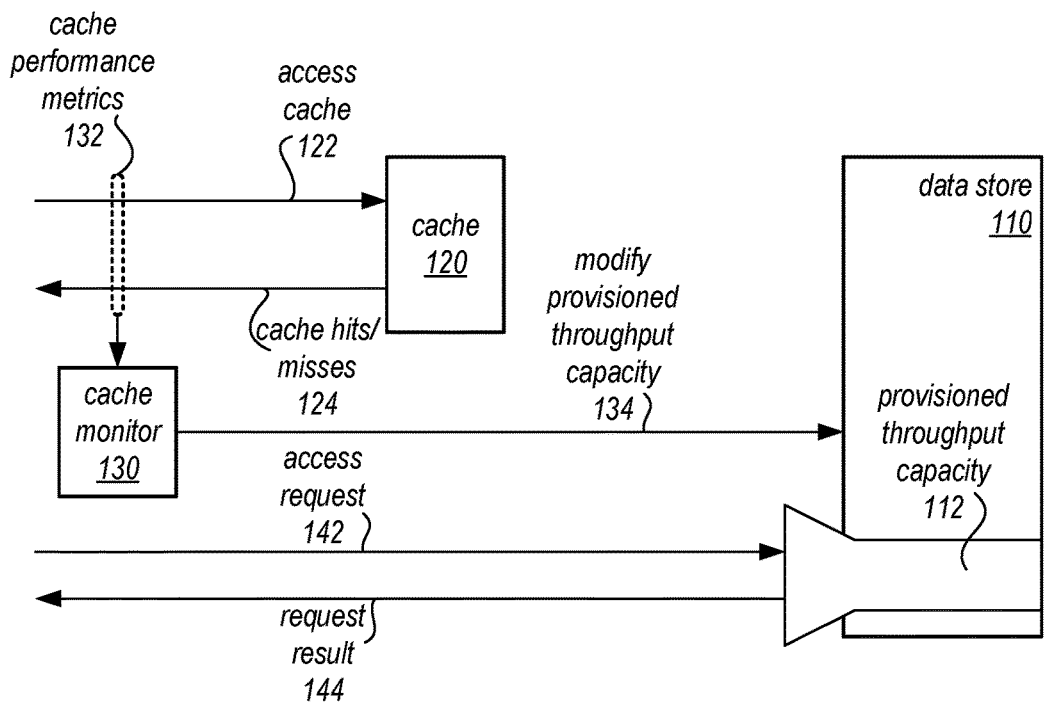
FIG. 1 is a series of block diagrams illustrating modifying provisioned throughput capacity for data stores according to cache performance, according to some embodiments.
Figure 1:
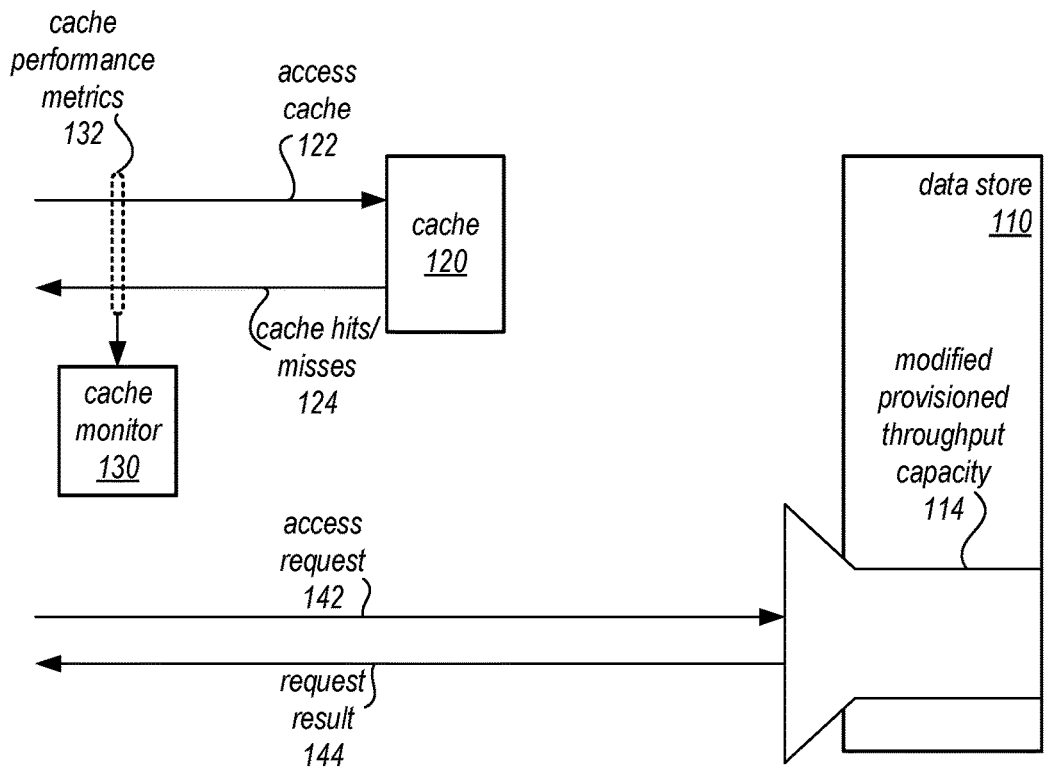

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f), interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of modifying provisioned throughput capacity for data stores according to cache performance are disclosed. Data stores or systems that rely upon data stores can experience significant fluctuations in load. To ensure that these changes in load do not affect system performance, resources to handle additional load may be reserved, allocated, or otherwise provisioned in order to provide a throughput capacity (e.g., a minimum or guaranteed rate at which access requests to the data store can be processed) for processing requests to access data in the data store. While provisioned throughput capacity can handle changes in load (at least up to the throughput capacity), such a strategy may create scenarios where smaller load results in provisioned throughput capacity, and thus resources, that are not used. In such scenarios, the resources provisioned to provide the throughput capacity (or the cost of provisioning the resources) may be wasted. Therefore, modifications to throughput capacity have been generally allowed so that clients or other consumers of a data stores can make decisions and send requests to change throughput capacity.

While changing throughput capacity does allow clients of a data store to adjust to changing circumstances, the decision to make adjustments is not always easy to determine. Other techniques for improving the performance of accessing a data store may change the amount and timing of modifications to throughput capacity. For example, many clients of data stores use caching to minimize processing load on a data store. A cache may store portions of the data maintained in the data store for faster access (e.g., by storing the cached data on system memory). When access requests to data are processed, a cache may first be accessed to determine whether the desired data is present in the cache. In this way, slower requests to the data store may be avoided when data in the cache may be used instead. Because utilizing a cache may change the frequency and type of interactions within a data store, adjustments to the provisioned throughput capacity may be different than if no cache were used. In various embodiments, however, provisioned throughput capacity may be modified based on cache performance.

Monitoring cache performance can provide valuable and timely insights about the load on data store and as well as the desired performance of the data store at a given moment. For example, in various embodiments, cache performance metrics may be evaluated with respect thresholds, conditions, or other criteria to determine when and/or how much to modify the provisioned throughput capacity of a data store. Because caching prevents some access requests from being made to a data store, cache performance metrics can indicate that change to the throughput capacity is more optimal or necessary earlier than if the interactions direct with the data store are utilized to determine the performance of modifications to throughput capacity.

FIG. 1 is a series of block diagrams illustrating modifying provisioned throughput capacity for data stores according to cache performance, according to some embodiments. In scene 102, data store 110 processes access requests 142 to data store in data store 110 and returns requested results 144 according to provisioned throughput capacity 112. Provisioned throughput capacity 112 may be a minimum guarantee of processing performance with respect to access requests to a particular data object (e.g., a database table), set of objects (e.g., multiple files), any portion of the data store 110 or the entire data store 110. For example, data store 110 may be implemented as a multi-tenant data store, storing data for multiple different clients. Provisioned throughput capacity 112 may be the provisioned throughput capacity for a particular portion of data stored for one of the clients (other clients or data may have different provisioned throughput capacities even if hosted on the same resources).

Cache 120 may be implemented to reduce the number of access requests 142 sent to data store 110. Access requests 122 to cache 120 may be made and either a cache hit occurs so that the requested data is returned 124 or a cache miss occurs because either the cache does not contain the requested data or the data maintained in the cache is no longer valid (e.g., having been changed by a write request to data store 110) and the requested data is not returned (along with a miss indication 124). For example, cache 120 may implement a result cache or buffer cache which stores data that has been previously retrieved from data store 110 in response to a read or get request and maintained in one or more memory components implemented as part of cache 120 for subsequent access. Please note that various cache maintenance strategies (e.g., write-through or write-back write policies) may determine how the cache is maintained or update, and that the previous discussion is not intended to be limiting.

Cache monitor 130 may be implemented to collect and/or determine cache performance metrics 132 based on the attempts to access cache 122 and the cache hits/misses 124 returned. For example, cache performance metrics may include a hit rate (e.g., indicating the number of cache hits over time), miss rate (e.g., indicating the number of cache misses over time), hit-to-miss ratio, the latency of misses, or any other measure or metric determined by the performance of the cache (e.g., eviction rate, utilization, etc.). Cache monitor 130 may determine one or more thresholds, conditions, or criteria for determining when and what adjustments to make to provisioned throughput capacity 112, as discussed below with regard to FIG. 9. For example, various kinds of analysis or machine learning techniques to identify thresholds for increasing and decreasing provisioned throughput capacity. Cache monitor 130 may detect when the conditions for performing a modification to provisioned throughput capacity 112 are satisfied, triggering a throughput modification and directing a request to modify provisioned throughput capacity 134 to data store 110.

As illustrated in scene 104, the modified provisioned throughput capacity 114 may be used to process access requests 142 and provide request results 144. Modifying provisioned throughput capacity based on cache performance metrics allow for throughput capacity to modified in automatic or dynamic fashion in response to the changing conditions indicated by changes in utilization of the cache. For example, an increase in cache miss rate may indicate that a higher volume of requests is likely to be directed to the data store (even if the overall change in the number of requests (including requests satisfied by both the cache and data store) has not changed. The change in miss rate may be detected before the increased volume of requests is detected at a data store, client, or other system or component monitoring requests to the data store and thus may trigger a request to increase to provisioned throughput capacity earlier.

The specification first describes an example of a provider network implementing data storage services that allow for modifying provisioned throughput capacity. A monitor service and cache service of the provider network may also be utilized for modifying provisioned throughput capacity for data stores according to cache performance. Included in the description of the example provider network are various aspects of the data storage services, cache service, and monitor service, and the various interactions among them. The specification also describes various alternative examples of clients, caches, and cache monitors. The specification then describes flowcharts of various embodiments of methods for modifying provisioned throughput capacity for data stores. Next, the specification describes an example system that may implement the disclosed techniques. Various examples are provided throughout the specification.

Figure 2:
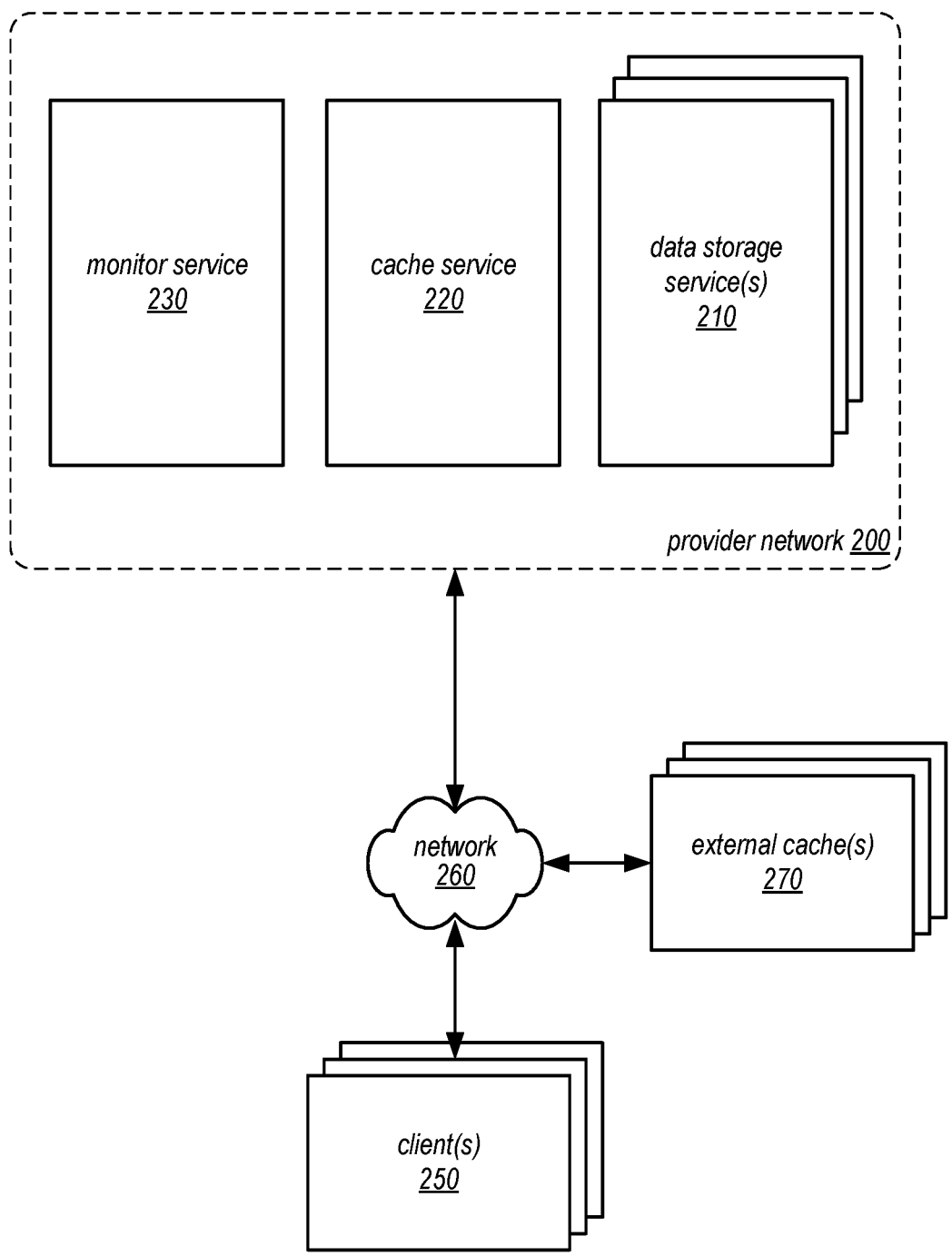
FIG. 2 is a block diagram illustrating various components of a provider network including data storage services that provide modifiable provisioned throughput capacity, according to some embodiments.

FIG. 2 is a block diagram illustrating various components of a provider network including data storage services that provide modifiable provisioned throughput capacity, according to some embodiments. Provider network 200 may be a private or closed system or may be set up by an entity such as a company or a public sector organization to provide one or more services (such as various types of cloud-based storage) accessible via the Internet and/or other networks to clients 250. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and storage services offered by the provider network 200. In some embodiments, provider network 200 may implement various computing resources or services, such as a virtual compute service, data storage service(s) 210, such as object storage services, block-based storage services, data warehouse storage service, cache service 220, monitor service 230, and/or any other type of network based services (which may include various other types of storage, processing, analysis, communication, event handling, visualization, and security services).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below. In various embodiments, the functionality of a given system or service component (e.g., a component of data storage service 210) may be implemented by a particular node or may be distributed across several nodes. In some embodiments, a given node may implement the functionality of more than one service system component (e.g., more than one data store component).

Data storage service(s) 210 may implement different types of data stores for storing, accessing, and managing data on behalf of clients 250 as a network-based service that enables clients 250 to operate a data storage system in a cloud or network computing environment. For example, data storage service(s) 210 may include various types of database storage services (both relational and non-relational) for storing, querying, and updating data. Such services may be enterprise-class database systems that are highly scalable and extensible. Queries may be directed to a database in data storage service(s) 210 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system. Data storage service(s) 210 may also include various kinds of object or file data stores for putting, updating, and getting data objects or files. Such data storage service(s) 210 may be accessed via programmatic interfaces (e.g., APIs) or graphical user interfaces. Data storage service(s) 210 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

Data storage service(s) 210 may be configured to provide throughput capacity provisioned for processing access requests to particular data or sets of data (e.g., data maintained on behalf of a particular client or associated with particular customer account). Provisioned throughput capacity may provide a minimum or guaranteed level, rate, or other measure of processing performance of access requests to the data store. Data storage service(s) 210 may allow for requests to be processed that exceed the provisioned throughput capacity in some instances (e.g., where available resources not reserved or allocated for the data can be utilized to process the request) or may block, timeout, fail, or throttle down requests received in excess of the provisioned throughput capacity.

In order to provide provisioned throughput capacity, data storage service(s) 210 may pre-allocate capacity and/or resources for the creation, growth, and management of data maintained on behalf of a client in response to traffic directed to the data, and not to overbook the resources on which that data is maintained. For example, in some embodiments, data maintained by the service (and underlying system) may utilize different configurations of resources to achieve a requested throughput capacity. If, for instance, a requested throughput capacity has a very high throughput capacity specified, faster (and often more expensive) memory, such as high performance media (e.g., flash memory or Solid State Drive, or SSD, media), or other resources may be reserved in order to meet the high throughput capacity. In some embodiments, data may be partitioned across multiple different types of storage resources in order to achieve the desired throughput capacity. When changing the provisioned throughput capacity, resources may be reallocated or reassigned, data transferred, split or otherwise reorganized, in order to provide the configuration of resources and data to meet the change to the provisioned throughput capacity. In at least some embodiments, changes to provisioned throughput capacity are performed while the data is still live and accessible to clients.

Clients and/or other components (such as cache monitor 300 discussed in FIG. 3 below) may request, specify, and or change the provisioned throughput capacity for data via request to an interface of data storage services, such as via an API call. To identify the amount or change in throughput capacity, the request may specify the throughput capacity in several ways. For example, the throughput capacity may be specified in terms of the work done when an access request targeting the data is received. Consider a read access to data that may require only one I/O operation to access (e.g., to read the data file of the table), while a write access to the data (e.g., an access that adds, deletes, or modifies the data) may require at least two I/O operations to access (e.g., to log the write access, and then to perform the access). In addition, as described herein, some individual service requests may read and/or write multiple items and/or item attributes in the table. Therefore, the provisioned throughput capacity may be specified in terms of a measure of normalized, logical work units over time, such as in term of "logical service request units per second". In one example, a service request that results in a read access targeting a single item in data may be considered to require (or consume) one logical service request unit, while a service request that results in a write access targeting a single item in a table may be considered to require (or consume) two or three logical service request units. Provisioned throughput capacity may also be provisioned in terms of a number of I/O operations per second (IOPS) or a number of service requests (i.e. API calls) per second that can be processed by a data storage service 210.

In some embodiments, provisioned throughput capacity may be specified differently for different types of access requests, such as read requests or write requests, or throughput capacity consumed by different access request may be normalized based on the amount of work performed by those requests. In general, the work done by service requests that include multiple read and/or write accesses (e.g., a query or scan request that may return anywhere from 0 to 1 MB of data) may be modeled in terms of logical service request units, which may be dependent on the number of logical work units that are required to service those requests and/or on the size of the item or items accessed by each of those requests. In various embodiments, the number of physical I/O operations (e.g., memory accesses) actually performed when servicing the request may be a fixed or varying multiple of the number of logical service request units required (or consumed) when servicing the request. For example, in some embodiments the number of physical I/O operations performed when servicing a given request may on the order of twice the number of logical service request units required (or consumed) in servicing the request.

As discussed above, client(s) 250 or other systems, components, or devices may request modifications to the provisioned throughput capacity for data. For example, a modification may be requested to obtain additional capacity in anticipation of an increase in the amount of data stored and/or access requests to the data. FIGS. 3-7 below discuss various techniques for determining when and the amount of a modification to provisioned throughput capacity to request based on cache performance metrics. In response to receiving the requests to modify provisioned throughput capacity, data storage services 210 may perform various reconfigurations, reallocations, reorganizations, or other operations to change the provisioned throughput capacity with respect to underlying resources storing the data.

In at least some embodiments, it may be desirable to implement a cache to increase the performance of access requests for data store in data storage service(s) 210. External cache(s) 270 may be implemented outside of provider network 200 on behalf of clients (e.g., as part of on-premise or client managed cache systems) or clients may utilize caching offered by cache service 220. Cache service 220 may provide deployment, operation, and scaling of an in-memory cache in the cloud. Cache service 220 may implement different caching engines for interacting with various data storage service(s) and applications. For example, a memory object caching engine or a key value caching engine may be implemented by cache service 220 to implement a cache on behalf of a client. Cache service 220 may implement various techniques to replicate cache contents to ensure consistency and redundancy. Cache service 220 may automatically detect cache failures and replace resources, such as cache nodes. As discussed below with regard to FIG. 4, cache service 220 may report cache performance metrics that may be evaluate for determining the conditions, thresholds, or criteria for throughput modifications and/or detecting/triggering throughput modifications, in some embodiments.

Monitor service 230 may be implemented as part of provider network to collect and track metrics for various services implemented as part of provider network 200 (e.g., cache service 220 and data storage service(s) 210) to collect and monitor log files or other records generated by different services, set alarms to notify stake holders, clients, customers, and other subscribers of provider network 200 based on the collected information, and automatically react to changes in resources hosted or implemented by the different services on behalf of clients. For example, monitor service 230 may track storage utilization, access requests, and other information describing different data stored in data storage resources or as discussed below with regard to FIGS. 3 and 4, monitor service 230 may track cache performance metrics for cache service 220 (or external cache(s) 270 that provide metrics to monitor service). In some embodiments, monitor service 230 may provide an interface, such as an API or GUI, that allows clients 250 to specify custom metrics, modify or describe alarms or other triggers (e.g., by defining or redefining throughput modifications as determined according to the various techniques discussed below with regard to FIG. 8), and/or describe various responsive actions to be performed in the event an alarm or trigger is detected. In this way, monitor service 230 may allow client(s) 250 to gain access to system-wide visibility into resource utilization, application performance, and operational health of services implemented as part of provider network 200.

Generally speaking, clients 250 may encompass any type of client configurable to submit network-based requests to provider network 200 via network 260, including requests for storage services (e.g., a request to create, read, write, obtain, or modify data in data storage service(s) 210, etc.). For example, a given client 250 may include a suitable version of a web browser, or may include a plug-in module or other type of code module configured to execute as an extension to or within an execution environment provided by a web browser. Alternatively, a client 250 may encompass an application such as a database application (or user interface thereof), a media application, an office application or any other application that may make use of storage resources in data storage service(s) 210 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with provider network 200. In some embodiments, client 250 may be configured to generate network-based services requests according to a Representational State Transfer (REST)-style network-based services architecture, a document- or message-based network-based services architecture, or another suitable network-based services architecture.

In some embodiments, a client 250 may be configured to provide access to provider network 200 to other applications in a manner that is transparent to those applications. For example, client 250 may be configured to integrate with an operating system or file system to provide storage on one of data storage service(s) 210 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 210 may be coordinated by client 250 and the operating system or file system on behalf of applications executing within the operating system environment.

Clients 250 may convey network-based services requests (e.g., access requests directed to data in data storage service(s), data in cache service 220, monitor service 230) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet. Similar connections and communication techniques may be implemented to facilitate communications between client(s) 250 and external cache(s) 270 which may be implemented as part of a same internal network as client(s) 250 or as part of a third party system or service.

Figure 3:
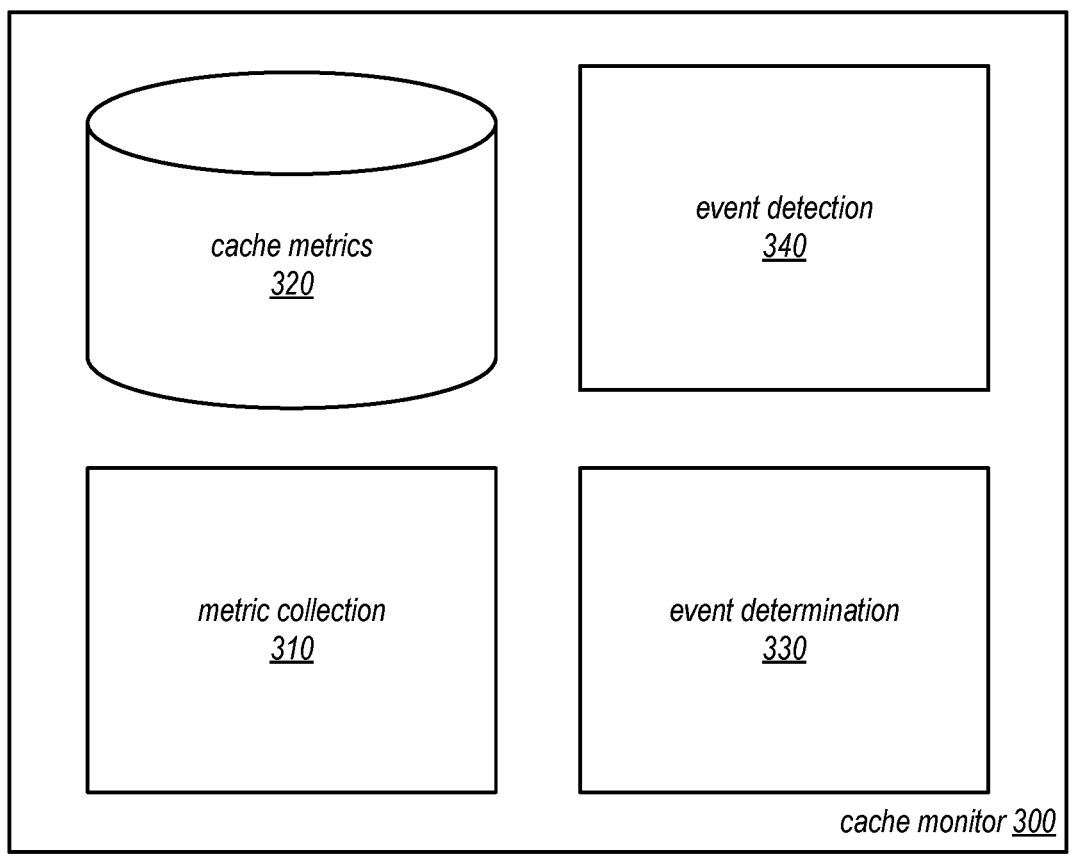
FIG. 3 is a block diagram illustrating a cache monitor for performing modifications to provisioned throughput capacity of a data store, according to some embodiments.

As noted above, data storage service(s) 210 may allow for throughput capacity for data to be provisioned and later modified. Modifying provisioned throughput capacity based on cache performance may be implemented to optimizing the timing and amount of modifications made to throughput capacity. FIG. 3 is a block diagram illustrating a cache monitor for performing modifications to provisioned throughput capacity of a data store, according to some embodiments. Cache monitor 300 may be implemented as part of a cache (e.g., as part of cache service 220), as part of a separate performance monitor (e.g., as part of monitor service 230), or as part of a data store (e.g., as part of data storage service(s) 210) in order to detect and modify the throughput capacity of a data store based on cache performance. In at least some embodiments, different functions of the cache monitor describe below may be implemented in distributed fashion (e.g., metric collection and determination implemented in one system and detection in another system, etc.).

Cache monitor 300 may implement metric collection 310 to request, track, or otherwise obtain cache performance metrics for a cache storing data for servicing access requests to a data store. For example, metric collection 310 may sweep metric collection agents implemented on clients, caches, or at data stores to determine either raw metrics (e.g., cache hits, cache misses) or calculated cache metric values (e.g., rate of change for the hit-to-miss ratio of the cache, etc.). In some embodiments, metric collection 310 may implement a programmatic interface (e.g., an API) for reporting raw or calculated metrics pushed from metric collection agents as they are received. Metric collection 310 may transform the cache metrics, for instance, by calculating specific metrics based on raw cache metric data (e.g., the rate of change for cache hits or misses). Metric collection may store cache metrics in cache metrics store 320 further analysis (e.g., by event detection 340 or event determination 330).

Cache monitor 300 may implement event determination 330 to determine the thresholds, conditions, or other criteria for triggering throughput modifications and/or the responsive actions to the throughput modifications (e.g., the amount that the throughput capacity should be changed). For example, event determination may obtain (e.g., from a client) or assume an optimal or efficient performance goal criteria for a data store (e.g., 80% utilization of provisioned throughput capacity in order to save some capacity for spikes of increased utilization) and determine hit rate or miss rate thresholds for lowering or raising throughput capacity in order to maintain an 80% utilization of the provisioned throughput capacity as a result of performing modifications. Event determination 330 may implement various kinds of machine learning and/or other statistical analysis techniques, such as those discussed below with regard to FIG. 8, in order to determine the throughput modification criteria and/or change amounts. Additionally, in some embodiments, event determination 330 may have access to data or metrics for other systems or components (e.g., request rates at data storage service 210 or from a client) in addition to cache performance metrics. For example, event determination 330 may correlate a percentage of change in the hit ratio with a decrease in read or write requests sent from a client. In some embodiments, the determined thresholds, conditions, or criteria may include criteria based on other data in addition to cache performance metrics (e.g., when miss rate falls below X threshold and when current throughput capacity cost exceeds Y threshold then lower throughput capacity Z percent). As numerous types of analysis may be employed by event determination 330 to identify thresholds, conditions, or other criteria for throughput modifications the previous examples are not intended to be limiting.

Throughput modifications may be triggered by event detection 340 in cache monitor 300. For example, event detection 340 may observe or receive the stream of cache metrics obtained or generated by metric collection 310 and compare them with the thresholds, criteria, or conditions of throughput modifications for which event detection 340 monitors (as determined by event determination 330 or configured by a client). If the cache performance metrics (and any other metrics or data included in the thresholds, conditions, or criteria for the throughput modification) satisfy the criteria for a throughput modification, then detection 340 may send a request or otherwise initiate a modification to the throughput capacity according to the detected. If, for example, the detected indicates that the throughput capacity should be decreased by X units per time period (e.g., IOPs or logical service request units per second), then detection 340 may format and send a request according to an AIP for the data storage service 210 storing the data to decrease the throughput capacity by X units per time period.

In some embodiments, other or additional responsive actions may be taken based on cache performance metrics. For example, instead of detecting a throughput modification, event detection 340 may detect a cache modification (e.g., to increase or decrease the size of the cache being monitored that services access requests to a data store). In this way, event detection 340 may be configured to tune multiple different performance parameters based on cache performance metrics if changing the other performance metrics may result in an optimal or more efficient scenario with regard to data store performance or cost to a client. Consider a scenario, wherein event detection 340 detects an event to increase cache size instead of changing throughput capacity in order to handle an increased read load on the data store, as the cost of the cache size increase may be less (or implemented quicker) than a change to the throughput capacity.

Figure 4:
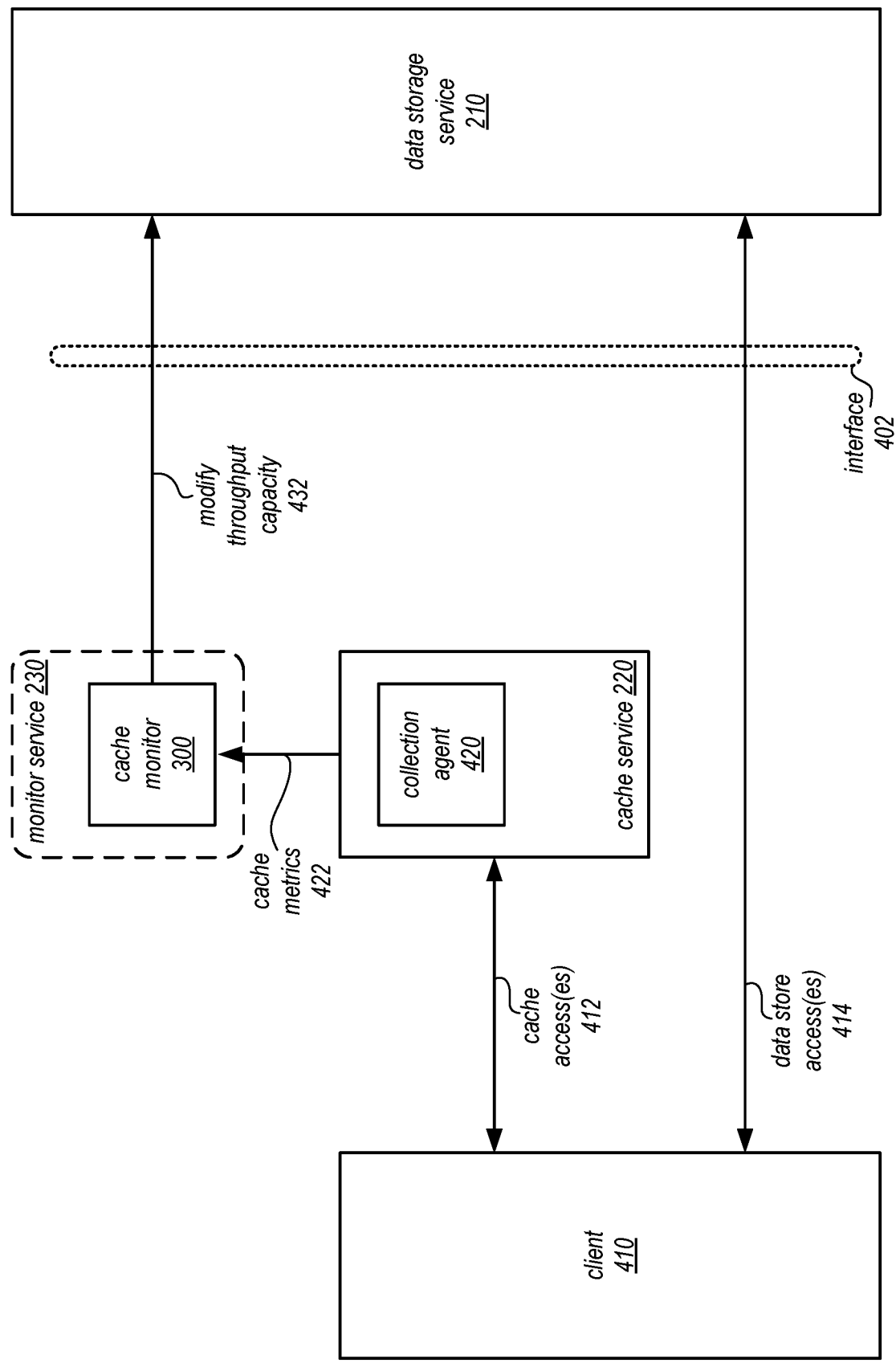
FIG. 4 is a block diagram illustrating a monitoring service that collects cache performance metrics and detects through modifications to modify the provisioned throughput capacity of a data store, according to some embodiments.

Because cache monitoring and modification of provisioned throughput can be implemented in various different systems or scenarios, FIG. 4 is a block diagram illustrating a monitoring service that collects cache performance metrics and detects through modifications to modify the provisioned throughput capacity of a data store, according to some embodiments. Client 410 may store data in data storage service 210 (e.g., a database table) that is accessed via data store access(es) 414 formatted according to interface 402 according to a provisioned throughput capacity for the data (e.g., 500 IOPs). Client 410 may also utilize cache service 220 to host a cache storing a portion of the data (e.g., various entries or items of the database table) in an in-memory cache which client 410 accesses 412 (which may also be accessed via an interface, not illustrated). Cache service may implement one or more collection agents 420 (e.g., on cache nodes or other components hosting the cache for client 410). Collection agent 420 may count, track, or measure cache performance and send raw cache metrics or generated cache metrics 422) to cache monitor 300, which may be implemented as part of monitor service 230. Cache monitor 300 may determine various thresholds, conditions, or criteria triggering a throughput modification for data stored in data storage service 210 based on the received cache metrics 422. If cache monitor service 230 detects a throughput modification, then cache monitor 300 may send a request 432 via interface 402 to modify throughput capacity at data storage service for the data (e.g., for the database table) according to the triggered throughput modification.

Figure 5:
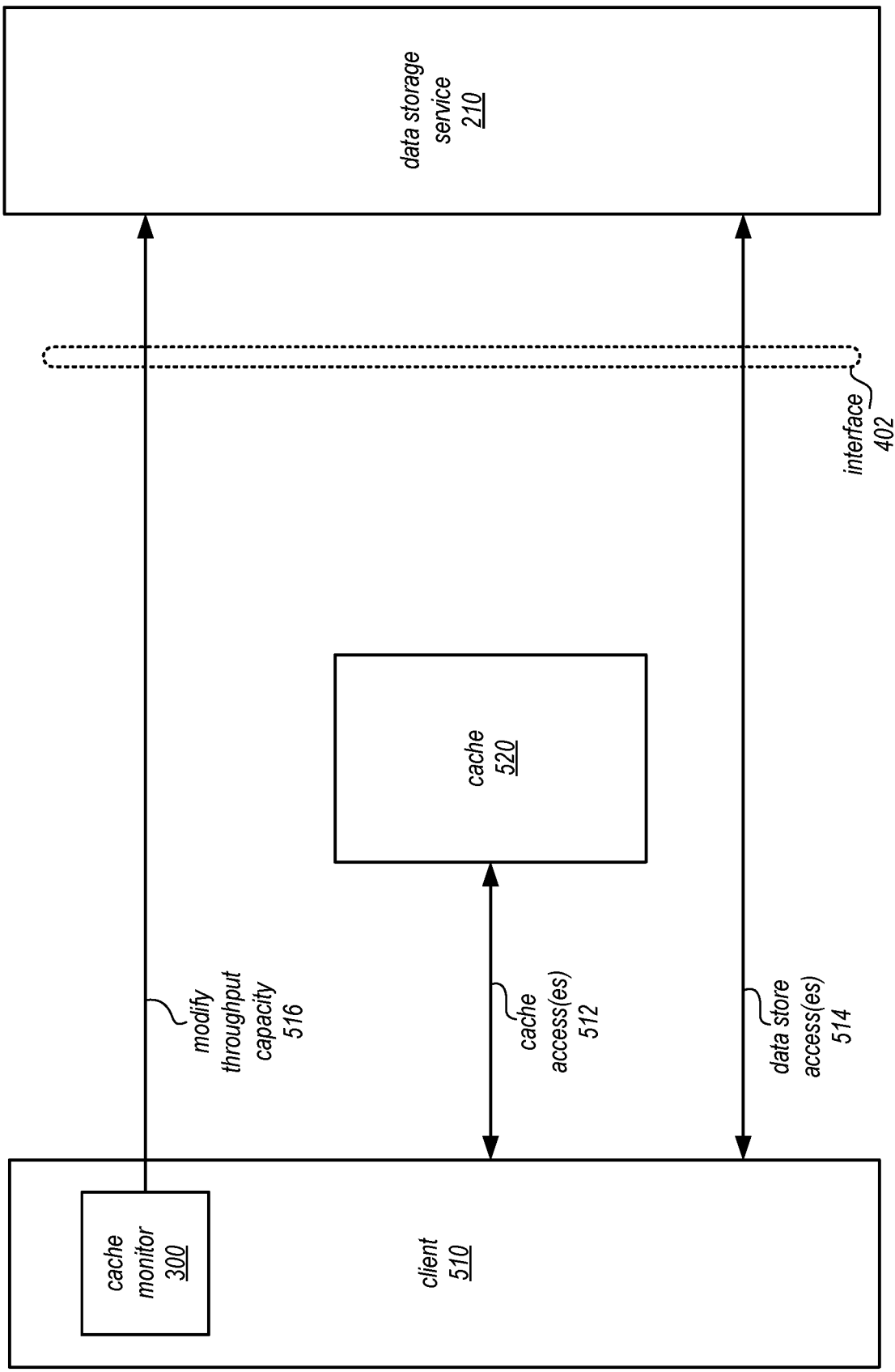
FIG. 5 is a block diagram illustrating a data store client implementing a cache monitor to modify the provisioned throughput capacity of a data store based on cache performance metrics, according to some embodiments.

In some embodiments, clients may implement portions or all of the functionality of cache monitor 300. For example, FIG. 5 is a block diagram illustrating a data store client implementing a cache monitor to modify the provisioned throughput capacity of a data store based on cache performance metrics, according to some embodiments. Client 510 may store data in data storage service 210 (e.g., a block-based data volume) that is accessed via data store access(es) 514 formatted according to interface 402 according to a provisioned throughput capacity for the data (e.g., 1,000 request units per second). Client 510 may also utilize cache 520 which may be implemented within a local network or hosted as part of a third party caching service to store a portion of the data (e.g., various blocks or pages of the data volume) in an in-memory cache which client 510 accesses 512 (which may also be accessed via an interface, not illustrated).

Client 510 may also implement cache monitor 300 (which may be downloaded or provided to client 510 from provider network 200. Cache monitor may count, track, or measure cache performance based on cache access(es) at client 510 and collect, track, and/or determine raw cache metrics or generated cache metrics. Cache monitor 300 may determine various thresholds, conditions, or criteria triggering a throughput modification for data stored in data storage service 210 based on the determined cache metrics. If cache monitor 300 detects a throughput modification, then cache monitor 300 may send a request 516 via interface 402 to modify throughput capacity at data storage service for the data (e.g., the data volume) according to the triggered throughput modification.

Figure 6:
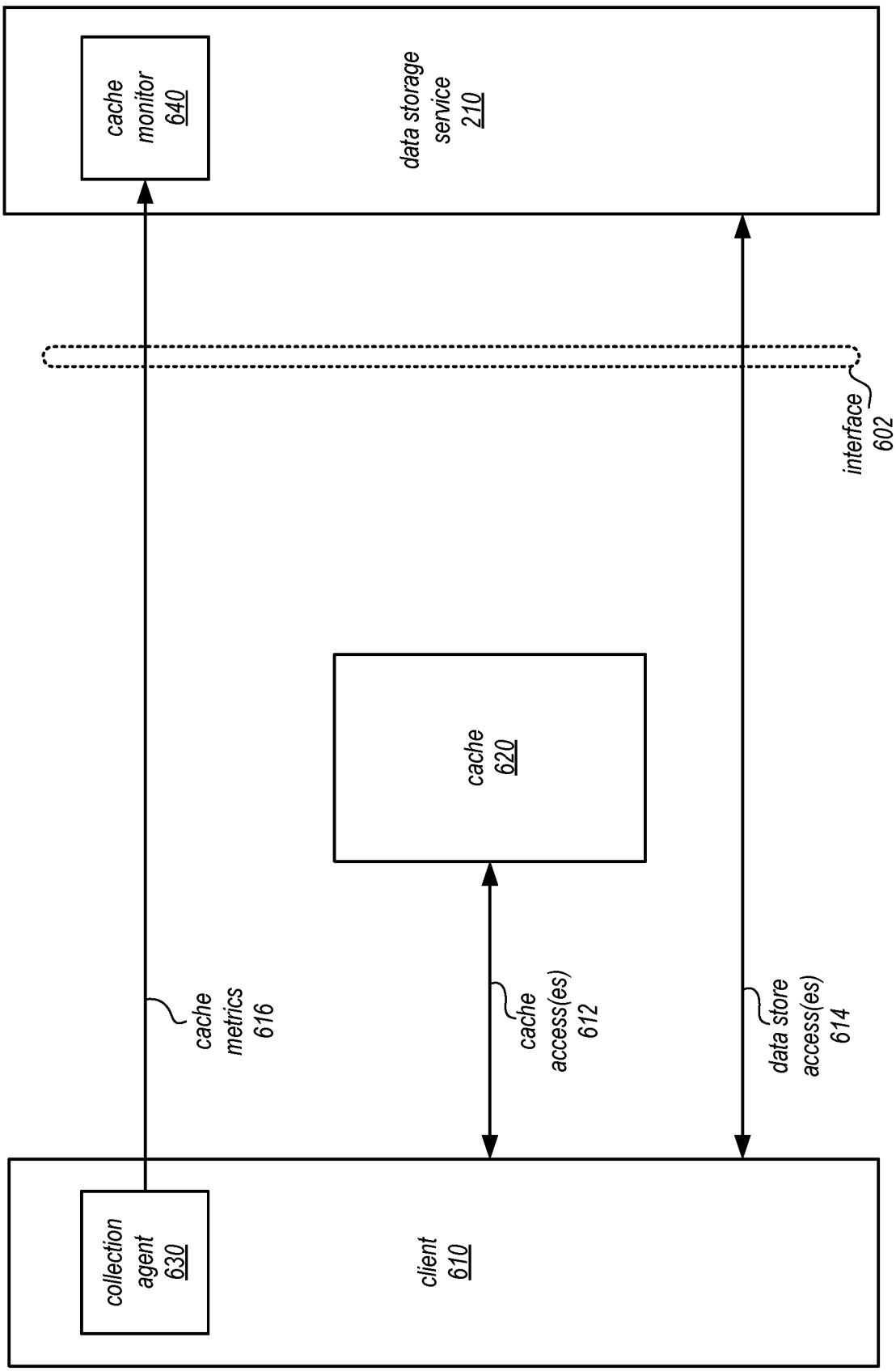
FIG. 6 is a block diagram illustrating a data store that collects cache performance metrics in order to modify the provisioned throughput capacity of the data store, according to some embodiments.

In some instances, it may be beneficial to have the data store monitor cache performance and determine modifications to provisioned throughput capacity. In this way, the data store can analyze cache performance metrics in conjunction with other data storage performance metrics (e.g., similar to monitor service 230 discussed in FIG. 4 which can also have insight into the performance of data storage service 210). FIG. 6 is a block diagram illustrating a data store that collects cache performance metrics in order to modify the provisioned throughput capacity of the data store, according to some embodiments. Client 610 may store data in data storage service 210 (e.g., a collection of data objects) that is accessed via data store access(es) 614 formatted according to interface 602 according to a provisioned throughput capacity for the data (e.g., 300 requests per second). Client 610 may also utilize cache 620 storing a portion of the data (e.g., various data objects of the collection of data objects) in an in-memory cache which client 610 accesses 612 (which may also be accessed via an interface, not illustrated). Client 610 may implement one or more collection agents 630 (e.g., an agent or set of capabilities provided as part of an software development kit (sdk) from data storage service). Collection agent 630 may count, track, or measure cache performance and send raw cache metrics or generated cache metrics 616) to cache monitor 640, which may be implemented as part of data storage service 210. Cache monitor 640 may determine various thresholds, conditions, or criteria triggering a throughput modification for data stored in data storage service 210 based on the received cache metrics 616. If cache monitor 640 detects a throughput modification, then cache monitor 640 may internally modify throughput capacity at data storage service 210 for the data (e.g., for the collection of data objects) according to the triggered throughput modification.

FIGS. 2-6 discussed above have described various different examples of a data store, such as a data storage service implemented as part of a provider network that allows for provisioned throughput capacity to be modified based on cache performance metrics for a cache that services some access requests directed toward data stored in the data store. Various other types of data stores, storage clients, cache monitors, and or caches may perform modifications to provisioned throughput capacity for data stores. Therefore, various techniques discussed above with regard to the data store, as well as techniques discussed below may be implemented.

Figure 7:
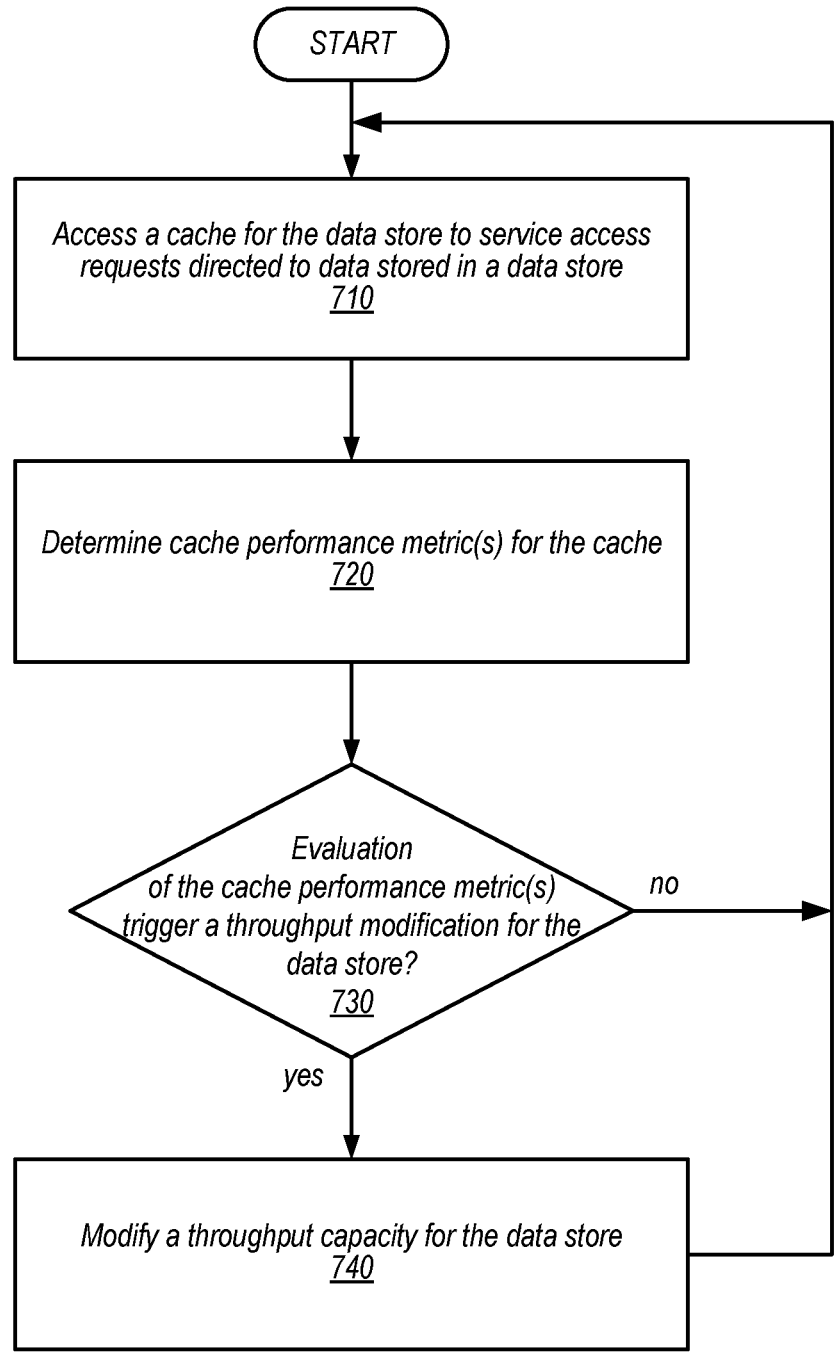
FIG. 7 is a high-level flow chart illustrating various methods and techniques to modify provisioned throughput capacity for data stores according to cache performance, according to some embodiments.

FIG. 7 is a high-level flow chart illustrating various methods and techniques to modify provisioned throughput capacity for data stores according to cache performance, according to some embodiments. As indicated at 710, a cache may be accessed to service access requests may be directed to data stored in a data store. For example, access requests may include different types of requests to read, get, obtain, delete, add, modify, put, or otherwise change the data specified in the request. A cache may be implemented to service some or all of these access requests based on portions (or all) of the data maintained in the cache. For example, access requests to read certain data blocks or pages, database entries, files, or other data objects may be compared with the contents of the cache to see if the request can be serviced based on the contents of the cache (e.g., if the specified data blocks or pages, database entries, files, or other data objects are present in the cache and not stale or different from the authoritative version stored in the data store). For access requests that may be serviced using contents of the cache, a cache hit may be indicated by returning the requested data. However, if the requested data is not present or stale (e.g., not consistent with the authoritative version in the data store due to another access request that modified or deleted the data), then a cache miss may be indicated in response to the access request. A client of the data store may receive the cache miss indication and in return send a request to the data store for servicing.

Various caching schemas or systems may be implemented. For instance, a distributed cache may implement multiple different cache nodes (e.g., implemented on different respective servers) to store different portions of data from the backend store. A hashing scheme or other deterministic technique to identify which cache node maintains desired data may be implemented so that clients can direct access requests to the cache node that does or should store desired data (if the desired data is in the cache). In another example, a monolithic or single cache node or server may be implemented to store all cached data from the data store in one location. Caches may be implemented as part of a same network or service provider as the data store (e.g., as discussed above with regard to FIG. 4) or may be implemented local to a client (e.g., on a same system or device as a storage client) or within a same local or private network with the client (as discussed above with regard to FIGS. 5 and 6).

While the cache is accessed to service access requests, cache performance metric(s) for the cache may be determined, as indicated at 720, in various embodiments. For example, counters for different cache responses (hits and misses) may be maintained an incremented for each different access request. Mapping or other information that identifies utilized or available storage locations in the cache may be evaluated to determine the utilization of the cache (e.g., how much memory is still available to store cache entries). An eviction manager or scheme to select which data in the cache is to replace in the event new data is received for storage in the cache may track the rate at which new data is evicted. Such operations, and or various other performance metrics for the cache may be determined at the cache by a collection agent or other component of the cache that aggregates the performance metrics for the cache. In some embodiments, additional transformation of raw cache performance metrics may be performed to generate additional cache performance metrics, such as the rate at which certain metrics change or the ratio of multiple metrics. Cache metrics may be determined in real-time, in some embodiments, and provided as a data stream for evaluation so that evaluation of the performance metrics may be performed in real time as well. In this way, throughput modifications may be triggered and modifications to throughput capacity of the data store may be performed dynamically, resulting in faster and better optimized throughput capacity adjustments than adjustments determined based on direct interaction with the data store alone.

As indicated at 730, an evaluation of the cache performance metric(s) may be performed to determine whether a throughput modification is triggered for the data store, in some embodiments. For example, different thresholds, criteria, or conditions may be maintained corresponding to different throughput modifications with throughput capacity modifications (e.g., threshold for increasing throughput capacity by X percent, threshold for decreasing throughput capacity by Y percent, threshold for increasing throughput capacity by Z percent, etc.). Note that different thresholds, criteria, or conditions corresponding to different provisioned throughput capacity for different data in a data store. For example, database A has provisioned throughput capacity of 215 IOPs and database B has provisioned throughput capacity of 247 IOPs. Because the different databases may be interacted with differently and each database has a different provisioned throughput capacity, different sets of throughput modifications may be determined for the different databases (according to the various techniques discussed below with regard to FIG. 8).

The cache performance metrics (and possibly other information, such as other performance metrics for the data store, client, or other system health, performance, or state information) may be evaluated with respect to the different thresholds, criteria, or conditions to determine if one of the different thresholds, criteria, or conditions for the throughput modification is satisfied. If so, then as indicated by the positive exit from 730, a throughput rate capacity for the data store may be modified, as indicated at 740. For example, a request may be formatted and sent according to an API for the data store identifying the data for which the throughput capacity is provisioned (e.g., a particular data object), the requested modification (e.g., specified according to a change in logical service work units or operations per second, such as a new rate, a percentage change, or a numerical change (add X units or remove Y units)). In some embodiments, the data store itself may receive and evaluate the cache performance metrics, so various internal APIs, instructions, or modification mechanisms may be triggered without sending a request via an external API. In at least some embodiments, an authorization check may be performed before allowing the triggered throughput modification (e.g., by sending a message requesting approval to a data owner, manager or stakeholder or by accessing a permissions policy for making throughput modifications for the data).

Evaluation of cache performance metrics may be implemented as part of continuous and automated monitoring for the cache (e.g., as indicated by the loop back arrows from 730 and 740) so that changes in load for the data store are anticipated by changes in the cache performance metrics. In at least some embodiments, clients or the data store may limit or throttle the number of modifications made in a given time period to prevent throughput capacity modifications from consuming to much data store resources.

Figure 8:
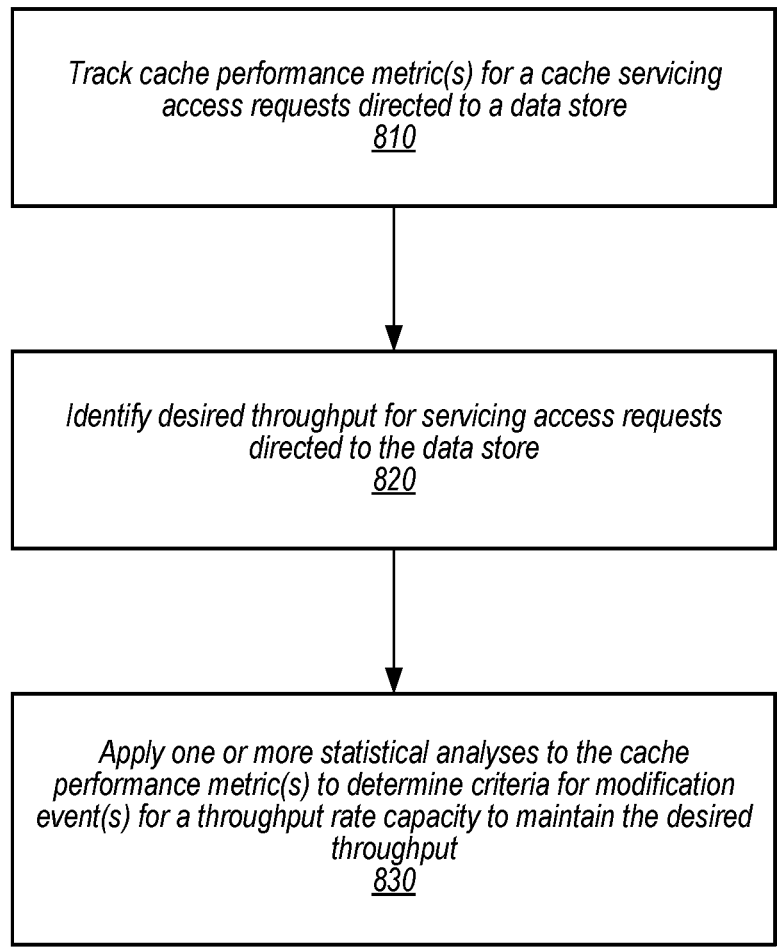
FIG. 8 is a high-level flow chart illustrating various methods and techniques to determine modifications for reserved throughput capacity, according to some embodiments.

As modifications of throughput capacity for a data store may be performed to dynamically respond to changes in cache performance metrics, the thresholds, conditions, or criteria in which modifications are performed may benefit from dynamic adaptation as well. FIG. 8 is a high-level flow chart illustrating various methods and techniques to determine modifications for reserved throughput capacity, according to some embodiments. As indicated at 810, cache performance metrics for a data store servicing access requests may be tracked. For example, historical performance metrics may be stored in a data store or streamed to a component, such as event determination 330 in FIG. 3 for live analysis. Cache performance statistics may be filtered, aggregated, averaged, or otherwise transformed.

As indicated at 820, desired throughput for servicing access requests to the data store may be identified, in some embodiments. For example, in some embodiments, a client may specify an expected or desired throughput (even if the provisioned throughput capacity is different). However, in some embodiments, tracking data or other information maintained for the load or number of requests sent to the data store may be analyzed to determine a throughput that efficiently or optimally services the load of requests sent to the data store.

One or multiple statistical analyses may be applied to the cache performance metrics in order to determine criteria, conditions, or thresholds for throughput modifications for throughput capacity provisioned at the data store, as indicated at 830, in some embodiments. For example, principle component analysis (PCA) may be applied to the cache performance metrics to identify correlations between cache performance metrics indicative of a change in load or number of requests that may be directed to a data store. In another example, regression analysis may be implemented to determine which cache performance metrics are indicate changes in load (and which do not). As many different kinds of statistical analysis may be implemented, the previous examples are not intended be limiting. For example, clustering analysis or other forms of dimensionality reduction may be employed to determine selection criteria. In addition to analyzing cache performance metrics with respect to load on the data store, cost benefit analysis may also be implemented in some embodiments. For example, in scenarios where more than the throughput capacity is adjustable to compensate for changes in load on the data store (e.g., changes to the cache size or capacity), then cost benefit analysis may be performed to enhance throughput modification criteria to only trigger throughput modifications in beneficial scenarios. In some cases, a change to a cache size may provide a less costly solution for handling higher load than an increase in throughput capacity, for instance.

Thresholds, criteria, or conditions for triggering throughput modifications may not remain static, in some embodiments, but instead may be modified either by a client or by a subsequent evaluation according to the various techniques described above. For example, a threshold to increase throughput capacity may be raised based upon a determination that the cost of additional throughput capacity is only beneficial if the demand on the data store changes significantly. In another example, a user of a data store may be able to view the different thresholds for changing throughput capacity and submit a request via an interface (e.g., a GUI for a network based monitoring service like monitor service 230 discussed above with regard to FIG. 2).

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers and other components that implement the database services/systems and/or storage services/systems described herein).

Figure 9:
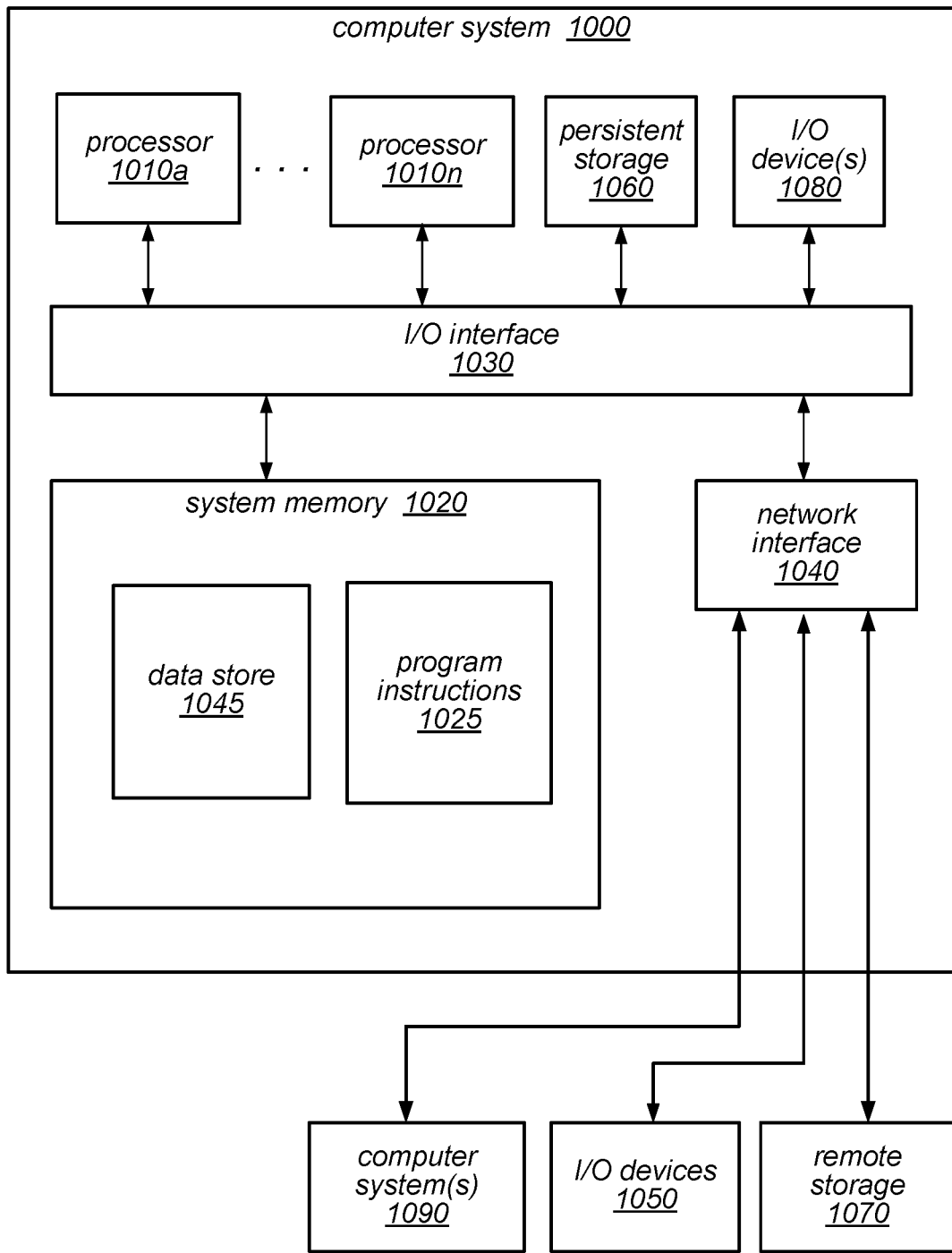
FIG. 9 is a block diagram illustrating an example computer system, according to various embodiments.

FIG. 9 is a block diagram illustrating a computer system configured to implement at least a portion of the database systems described herein, according to various embodiments. For example, computer system 1000 may be configured to implement a database engine head node of a database tier, or one of a plurality of storage nodes of a separate distributed storage system that stores databases and associated metadata on behalf of clients of the database tier, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1220 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a database engine head node of a database tier, or one of a plurality of storage nodes of a separate distributed storage system that stores databases and associated metadata on behalf of clients of the database tier, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. For example, the information described herein as being stored by the database tier (e.g., on a database engine head node), such as a transaction log, an undo log, cached page data, or other information used in performing the functions of the database tiers described herein may be stored in data store 1045 or in another portion of system memory 1020 on one or more nodes, in persistent storage 1060, and/or on one or more remote storage devices 1070, at different times and in various embodiments. Similarly, the information described herein as being stored by the storage tier (e.g., redo log records, coalesced data pages, and/or other information used in performing the functions of the distributed storage systems described herein) may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more web services. For example, a database engine head node within the database tier of a database system may present database services and/or other types of data storage services that employ the distributed storage systems described herein to clients as web services. In some embodiments, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various embodiments, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
one or more computing nodes, respectively comprising a processor and a memory, configured to implement a cache monitor for a cache, wherein the cache is configured to service access requests directed to a data store;
the cache monitor configured to:
evaluate one or more cache performance metrics of the cache;
determine, based at least in part on the evaluation of the one or more cache performance metrics, a modification to a throughput capacity of the data store;
modify the throughput capacity of the data store, such that one or more subsequent access requests processed at the data store are processed according to the modified throughput capacity.

2. The system of claim 1, wherein to modify the throughput capacity of the data store, the cache monitor is configured to:
send, via a programmatic interface of the data store, a request to the data store indicating the modification to the throughput capacity of the data store.

3. The method of claim 2, wherein the cache receives the access requests directed to the data store from one or more clients, and wherein the cache monitor is implemented by a client of the one or more clients.

4. The method of claim 2, wherein the cache monitor is implemented by a monitor service separate from the cache, and wherein, prior to evaluating the one or more cache performance metrics, the cache monitor is further configured to:
receive the one or more cache performance metrics from a metrics collection agent.

5. The method of claim 1, wherein the cache monitor is implemented by the data store, and wherein, prior to evaluating the one or more cache performance metrics, the cache monitor is further configured to:
receiving the one or more cache performance metrics from a metrics collection agent.

6. The system of claim 1, wherein the cache monitor is further configured to:
apply one or more statistical analyses to historical cache performance metrics maintained for the cache in order to determine criteria for modifying the throughput capacity of the data store; and
determine that the criteria for modifying the throughput capacity of the data store is satisfied.

7. The system of claim 1, wherein the data store is a network-based data storage service implemented as part of a provider network, wherein the cache is implemented as part of a cache service of the provider network.

8. A method, comprising:
performing, by one or more computing devices:
evaluating one or more cache performance metrics for a cache servicing access requests for a data store;
determining, based at least in part on the evaluation of the one or more cache performance metrics, a modification to a throughput capacity of the data store;
modifying the throughput capacity of the data store, such that one or more subsequent access requests processed at the data store are processed according to the modified throughput capacity.

9. The method of claim 8, wherein the modifying the throughput capacity of the data store further comprises:
sending, via a programmatic interface of the data store, a request to the data store indicating the modification to the throughput capacity of the data store.

10. The method of claim 8, wherein the access requests for the data store are received by the cache from one or more clients, and wherein the evaluating, determining, and modifying are performed by a client of the one or more clients.

11. The method of claim 9, wherein the evaluating, determining, and modifying are performed by a monitor service separate from the cache, and wherein, prior to evaluating the one or more cache performance metrics, the monitor service further performs:
- receiving the one or more cache performance metrics from a metrics collection agent.

12. The method of claim 8, wherein the evaluating, determining, and modifying are performed by the data store, and wherein, prior to evaluating the one or more cache performance metrics, the data store further performs:
- receiving the one or more cache performance metrics from a metrics collection agent.

13. The method of claim 8, wherein prior to determining the modification to the throughput capacity of the data store, the method further comprises:
- determining criteria for modifying the throughput capacity of the data store based, at least in part, on applying one or more statistical analyses to historical cache performance metrics maintained for the cache, and
- determining that the criteria for modifying the throughput capacity of the data store is satisfied.

14. The method of claim 8, wherein the throughput capacity of the data store is modified prior to modifying another throughput capacity of the data store determined based on access request metrics for the access requests for the data store.

15. One or more non-transitory, computer-readable storage media, storing program instructions that when executed on or across one or more computing devices, cause the one or more computing devices to implement a cache monitor to:
- evaluate one or more cache performance metrics for a cache servicing access requests for a data store;
- determine, based at least in part on the evaluation of the one or more cache performance metrics, a modification to a throughput capacity of the data store;
- modify the throughput capacity of the data store, such that one or more subsequent access requests processed at the data store are processed according to the modified throughput capacity.

16. The one or more non-transitory, computer-readable storage media of claim 15, wherein to modify the throughput capacity of the data store, the one or more computing devices of the cache monitor:
- send, via a programmatic interface of the data store, a request to the data store indicating the modification to the throughput capacity of the data store.

17. The one or more non-transitory, computer-readable storage media of claim 16, wherein the access requests for the data store are received by the cache from one or more clients, and wherein the cache monitor is implemented as part of a client of the one or more clients.

18. The one or more non-transitory, computer-readable storage media of claim 16, wherein the cache monitor is implemented as part of a monitor service separate from the cache, and wherein, prior to evaluating the one or more cache performance metrics, the one or more computing devices of the cache monitor further implement:
- receive the one or more cache performance metrics from a metrics collection agent.

19. The one or more non-transitory, computer-readable storage media of claim 15, wherein the cache monitor is implemented as part of the data store, and wherein, prior to evaluating the one or more cache performance metrics, the one or more computing devices of the cache monitor further implement:
- receive the one or more cache performance metrics from a metrics collection agent.

20. The one or more non-transitory, computer-readable storage media of claim 15, wherein prior to determining the modification to the throughput capacity of the data store, the one or more computing devices of the cache monitor further implement:
- determine criteria for modifying the throughput capacity of the data store based, at least in part, on applying one or more statistical analyses to historical cache performance metrics maintained for the cache, and
- determine that the criteria for modifying the throughput capacity of the data store is satisfied.

* * * * *